United States Patent [19]

Crisman et al.

[11] Patent Number: 5,782,335
[45] Date of Patent: Jul. 21, 1998

[54] METHOD AND APPARATUS FOR PARTS CONVEYANCE

[75] Inventors: David Crisman, Baraboo, Wis.; Glen D. Kemnitz, Gallatin; Richard L. Minchey, Goodlettesville, both of Tenn.

[73] Assignee: Sunbeam Products, Inc., Fort Lauderdale, Fla.

[21] Appl. No.: 220,416

[22] Filed: Mar. 31, 1994

[51] Int. Cl.⁶ ............................................. B65G 17/32
[52] U.S. Cl. .............................. 198/465.4; 198/687.1
[58] Field of Search ............................ 198/678.1, 680, 198/465.4, 687.1

[56] References Cited

U.S. PATENT DOCUMENTS

| | | | |
|---|---|---|---|
| 3,430,754 | 3/1969 | Meseke et al. | 198/465.4 |
| 3,469,535 | 9/1969 | Warner | 198/465.4 X |
| 3,499,518 | 3/1970 | Goodpaster | 198/465.4 |
| 3,707,925 | 1/1973 | Byrnes, Sr. | 198/465.4 X |
| 3,736,622 | 6/1973 | Wallace | 198/465.4 X |
| 4,838,036 | 6/1989 | Norrie | 198/465.4 X |
| 5,050,833 | 9/1991 | Usner | 198/465.4 X |
| 5,125,498 | 6/1992 | Meyn | 198/465.4 |

*Primary Examiner*—D. Glenn Dayoan
*Attorney, Agent, or Firm*—Michael J. Kline; Carol I. Bordas

[57] ABSTRACT

A method and apparatus for parts conveyance a part which is connected to a conveyance device, such as a conveyer chain, through the use of a hanger tab. After the part is removed from the conveyance device, the hanger tab is detached from the part and discarded.

11 Claims, 4 Drawing Sheets

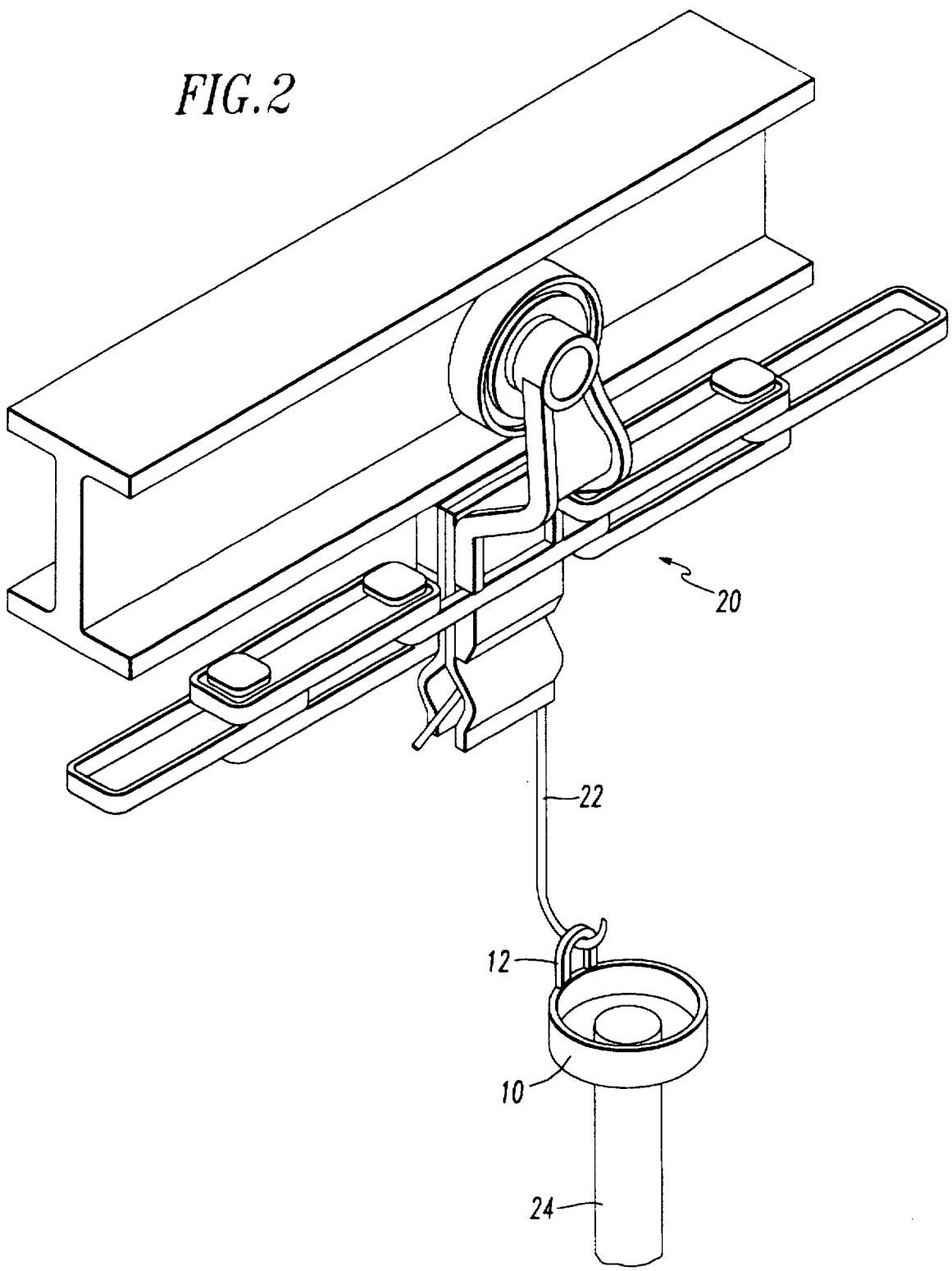

METHOD AND APPARATUS FOR PARTS CONVEYANCE

FIELD OF THE INVENTION

The present invention relates to a method and apparatus for moving or conveying a part or item. More specifically, the invention relates to a method and apparatus for moving a part or item along an assembly line or within a factory and, even more particularly, to a means and apparatus for conveying a part or item while it is being painted.

BACKGROUND OF THE INVENTION

In the prior art, a typical method and apparatus for conveying items consisted of suspending the item from an overhead conveyer chain and allowing the conveyer chain to move the item from stage to stage along the assembly line. Suspending the item from the conveyer chain was typically accomplished by using a hook, clamp, or other such means from which the item dangled. This is a particularly efficient way to move items along an assembly line or through a factory because of the simplicity of the design and the ease of use which is inherent in such a system. For example, a piece of wrought iron furniture of almost any size and shape is easily suspended from a hook by placing an unbroken portion of the frame of the furniture on the hook. The piece of furniture is securely held by the hook while it is in transit and it is easily removed from the hook when its journey is completed.

The prior art is deficient, however, in that when such a means is used to secure the item, it poses problems during certain stages of the manufacturing process. For example, during the painting process, a hook, clamp, or other such means shields a portion of the item from the sprayed paint intended to cover the item. As a result, after the item is painted, it must be manually touched-up in order to cover the unpainted portion caused by the hook, clamp, or other such suspension means.

In addition, the hook or clamp, which suspends the item, can scratch or otherwise damage the item being conveyed. This necessitates taking special precautions to prevent such damage, adding an additional manufacturing step to repair the damage, or selling the goods with these minor imperfections.

SUMMARY OF THE INVENTION

The present invention solves the above-mentioned problems in the prior art by integrating a removable hanger means, such as a tab, into the item itself. This hanger tab can accommodate a hook, clamp, or other suspension device. When the item is removed from the conveyer chain, the hanger tab is removed from the item and is discarded.

It is an object of the present invention to provide an inexpensive method and apparatus for conveying items.

It is still another object of the present invention to provide a method and apparatus for conveying items which is compatible with existing manufacturing techniques and systems.

It is yet another object of the present invention to eliminate the need to have items repainted because the method and apparatus for conveying the items through the painting stage interfered with the painting process.

BRIEF DESCRIPTION OF THE DRAWINGS

FIG. 1b shows a side plan of the "foot cup" embodiment of the present invention shown in FIG. 1a.

FIG. 2 shows an isometric view of the present invention being used to suspend an item from an overhead conveyer chain.

DETAILED DESCRIPTION OF THE PREFERRED EMBODIMENTS

Figure 1A:
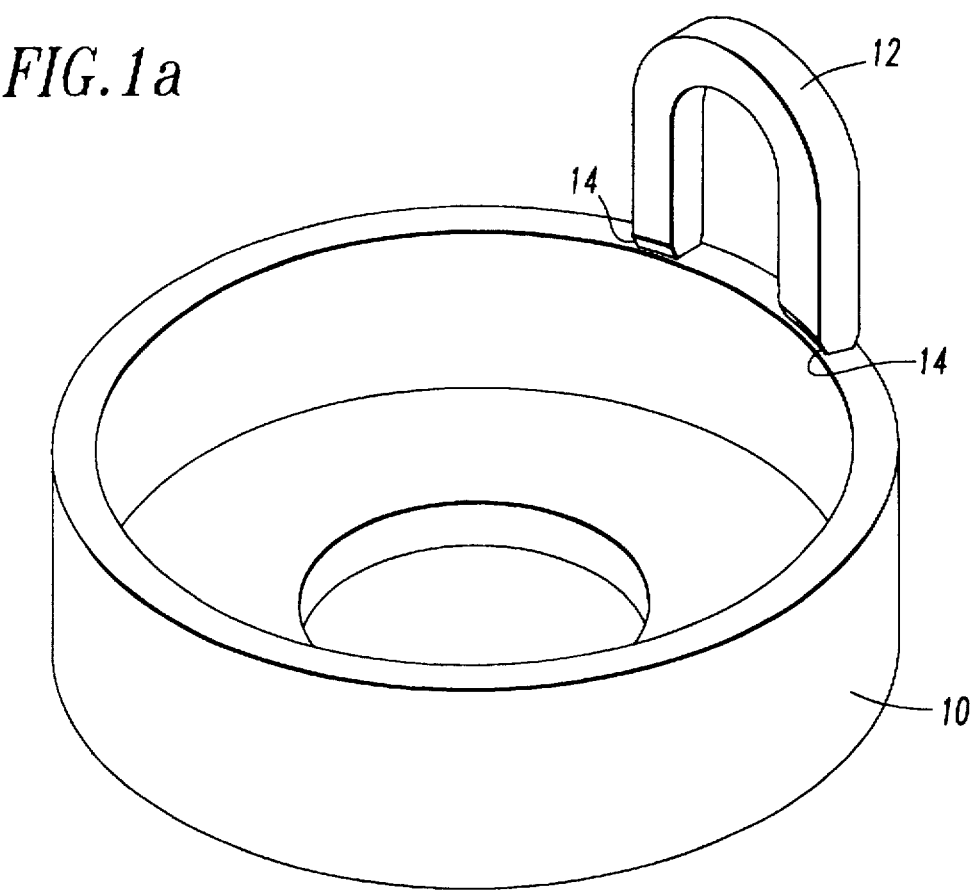
FIG. 1a shows an isometric view of the present invention integrated into a foot cup for use with outdoor furniture.

FIG. 1a shows an embodiment of the present invention which is used with outdoor furniture. Foot cups 10 are typically attached to outdoor furniture, i.e., by welding, prior to the painting stage. As shown in FIG. 1a, a hanger tab 12 is integrated into a foot cup 10 in order to provide an attachment point for a suspension means of a conveyer chain.

FIG. 2 shows the present invention in use. A conveyer chain 20 and a suspension means 22, comprised of a hook, suspend an item 24, such as a piece of outdoor furniture, from the hanger tab 12. The hanger tab 12 is attached to the foot cup 10. In the preferred embodiment of the present invention, the hanger tab 12 and foot cup 10 are manufactured as a single piece. This piece is stamped by using a progressive die to form the foot cup with the hanger tab protruding therefrom.

Figure 1B:
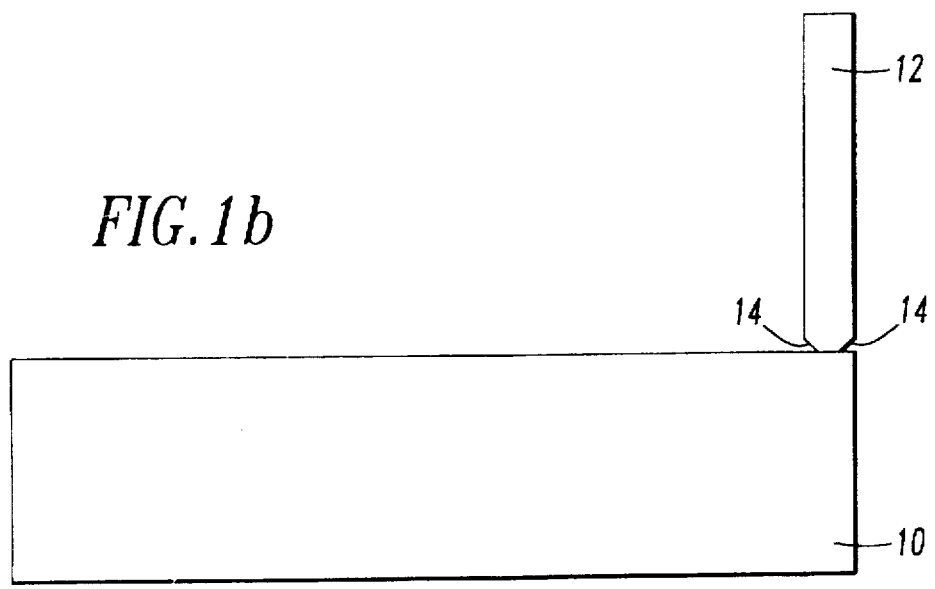
Figure 3:
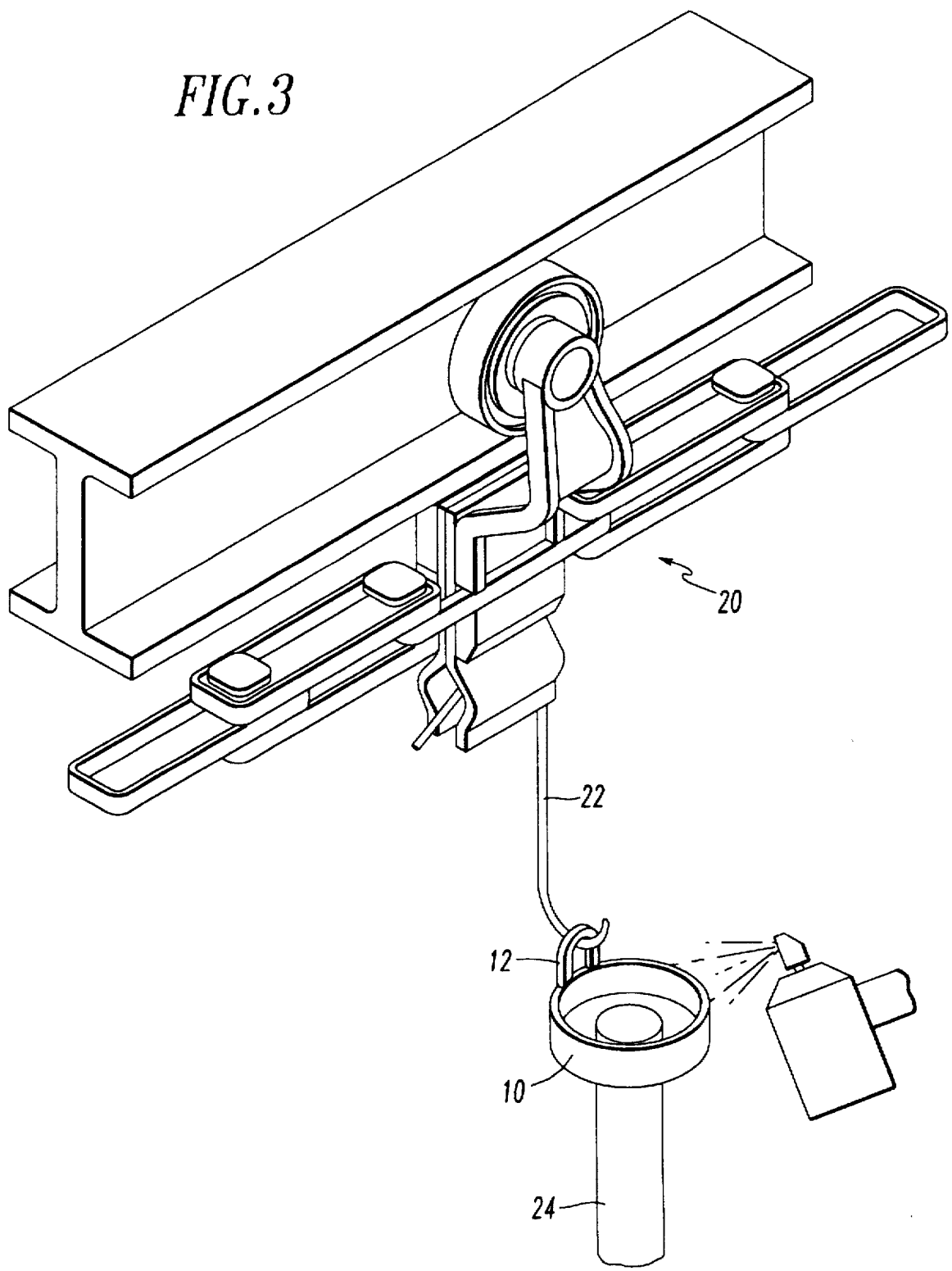
FIG. 3 shows an isometric view of the present invention of FIG. 2 being utilized in a painting procedure.
Figure 4:
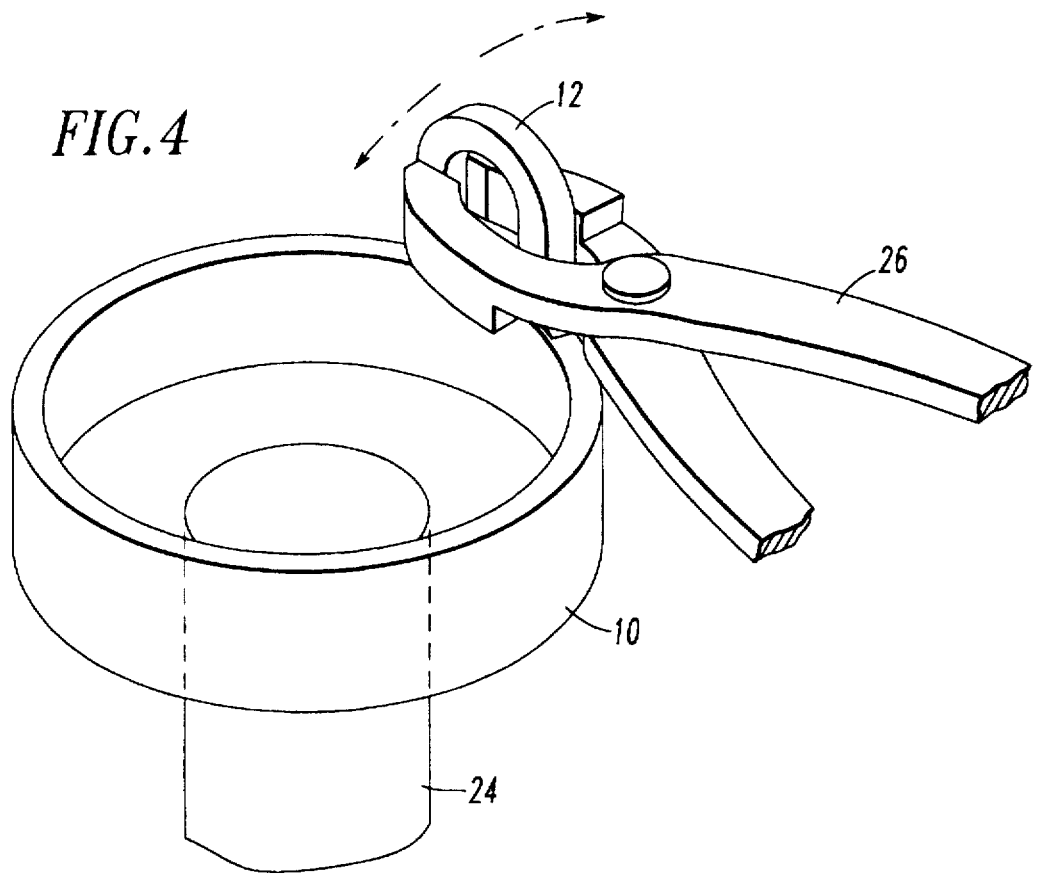
FIG. 4 shows the present invention of FIG. 2 wherein a hanger tab is being separated from a foot cup.

After the item 24 has been painted as shown in FIG. 3, for example, in an electrostatic spray paint booth, and removed from the conveyer chain, the hanger tab 12 is removed from the foot cup 10. To facilitate removal of the hanger tab 12, one or more notches or scored sections 14 in the hanger tab 12 may be provided, as shown in FIGS. 1a and 1b. The hanger tab 12 is removed from the foot cup 10 as shown in FIG. 4, for example, by grasping the tab 12 with pliers 26, and bending the tab 12 in the directions of the arrows along the scored sections 14 until the tab 12 shears off from the foot cup 10. The tab 12 is then discarded. Only two small unpainted areas are exposed where the hanger tab 12 had previously been attached to the foot cup 10. Since these unpainted portions are on the bottom of the foot cup 10 and are quite small, they do not need to be touched up with paint.

Of course, the hanger tab 12 need not be integrated into a foot cup 10. The hanger tab 12 could be integrated into, for example, the underside of a table or seat, or any other unexposed or underexposed portion of the item being conveyed or painted.

Of course, for larger objects, more than one hanger tab 12 may be advantageously used.

The hanger tab 12 may even be attached to an exposed portion of the item to be conveyed or painted because the unpainted surface created when the hanger tab 12 is detached from the item is very small.

Figure 5:
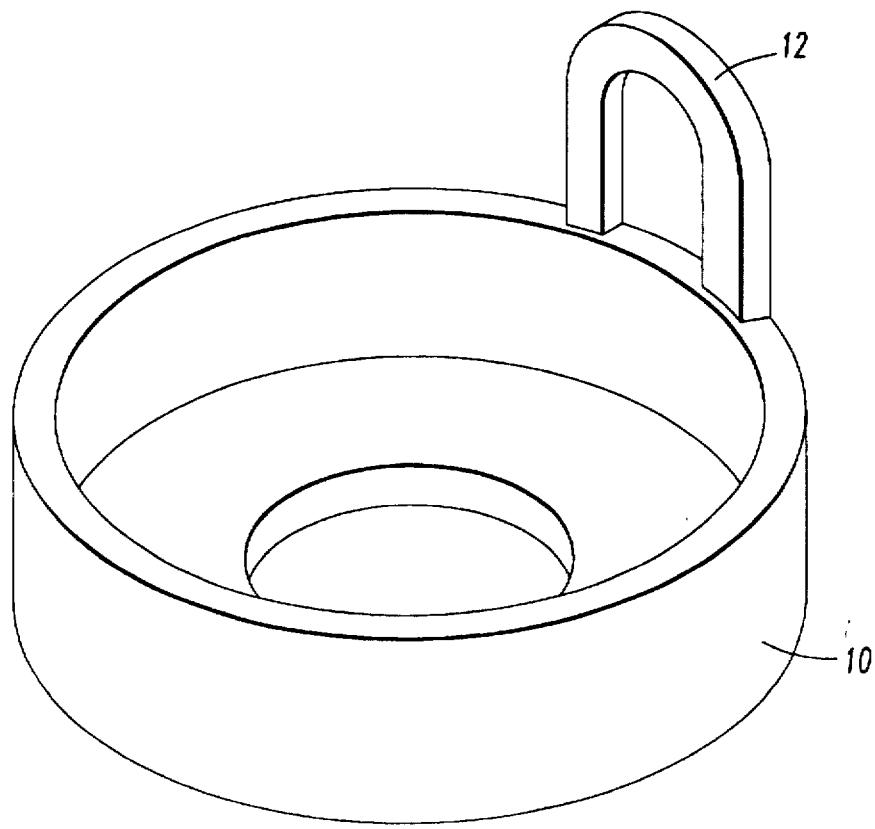
FIG. 5 shows an isometric view of another embodiment of the present invention wherein a hanger tab is removably attached to a foot cup by magnetism.

FIGS. 1a and 2 show the hanger tab 12 as a horseshoe-shaped piece having two points of attachment to the foot cup. Other shapes and embodiments of the hanger tabs are, of course, possible. For example, a hanger tab may have only one point of attachment to the item, the hanger tab may be a solid piece suitable to be grasped by a "clamp-like" suspension means, and the hanger tab may incorporate a hook to replace or act in conjunction with the suspension means 22. In the case of lightweight, metallic items 10, the hanger tab 12 may be magnetic, as shown in FIG. 5. In such an embodiment, the hanger tab 12 could remain on the conveyer chain 20 when the hanger tab 12 and the item 10 are separated. In addition, the hanger tabs 12 would be reusable.

Other variations will now be readily apparent to one of ordinary skill in the art. For example, the present invention can be adapted for use with almost any type of housing, such as those used for blenders, air-conditioners, and computers. In addition, the present invention can be adapted for use with component parts, such as fan blades, mesh panels, thermometer and scale dials, and even automobile components such as doors, hoods, trunks, and wheel rims. This list is, of course, by no means exhaustive. The present invention can be used on just about anything which is conveyed, on an assembly line or otherwise.

Although the present invention is particularly useful when the item is to be painted, painting is certainly not essential in order to realize the benefits of the present invention.

Although the invention has been described in detail in the foregoing for the purpose of illustration, it is to be understood that such detail is solely for that purpose, and that variations can be made therein by those of ordinary skill in the arts without departing from the spirit and scope in the invention as defined by the following claims. All such variations are specifically intended to be embraced within the scope of the following claims, including all equivalents thereof.

We claim:

1. An apparatus for parts conveyance, comprising a hanger means having means for allowing said hanger means to be removably attached to a part, said hanger means being suited to be engaged by a means for conveying said part, wherein said hanger means has notches to facilitate the removal of said hanger means from said part.

2. The apparatus for parts conveyance of claim 1, wherein said part is a piece of outdoor furniture.

3. The apparatus for parts conveyance of claim 1, wherein:
   (a) said hanger means is horseshoe shaped and has an open end, and
   (b) said hanger means is attached to said part at the open end of said hanger means.

4. The apparatus for parts conveyance of claim 1, wherein said hanger means is a solid tab, capable of being grasped by a clamp-like device.

5. The apparatus for parts conveyance of claim 1, wherein said hanger means consists of a hook.

6. A part having removably fastened thereto hanger means for hanging said part on conveying means, wherein said hanger means is integral and forms a single piece with said part being conveyed, said hanger means including an opening therein for receiving hook means conveyed by said conveyance means, said hanger means further including at least one frangible section proximate said part, wherein said at least one frangible section is a weakened portion of said hanger means enabling said hanger means to be removed from said part following conveyance thereof.

7. The part of claim 6 wherein said hanger means frangible section comprises a notch in said hanger means.

8. The part of claim 6 wherein said hanger means comprises a unshaped loop, each end thereof being fastened to said part and having a frangible section proximate said part.

9. A method of parts conveyance, comprising the steps of:
   (a) providing a hanger means integral with a part, wherein said hanger means is removable from said part;
   (b) attaching said part to a conveying means with said hanger means;
   (c) conveying said part;
   (d) removing said part from said conveying means; and
   (e) removing said removable hanger means from said part.

10. A method of parts conveyance, comprising the steps of:
   (a) integrating a hanger means into a part, wherein said hanger means is removable from said part;
   (b) attaching said part to a conveying means, said attachment being done with said hanger means;
   (c) conveying said part; and
   (d) separating said removable hanger means from said part.

11. The method of claim 10 wherein during said conveying step said part is subjected to a painting-procedure.

* * * * *